Jan. 20, 1931.  O. S. HERSHEY ET AL  1,789,437
SPARE TIRE LOCK
Filed Oct. 26, 1928  2 Sheets-Sheet 1
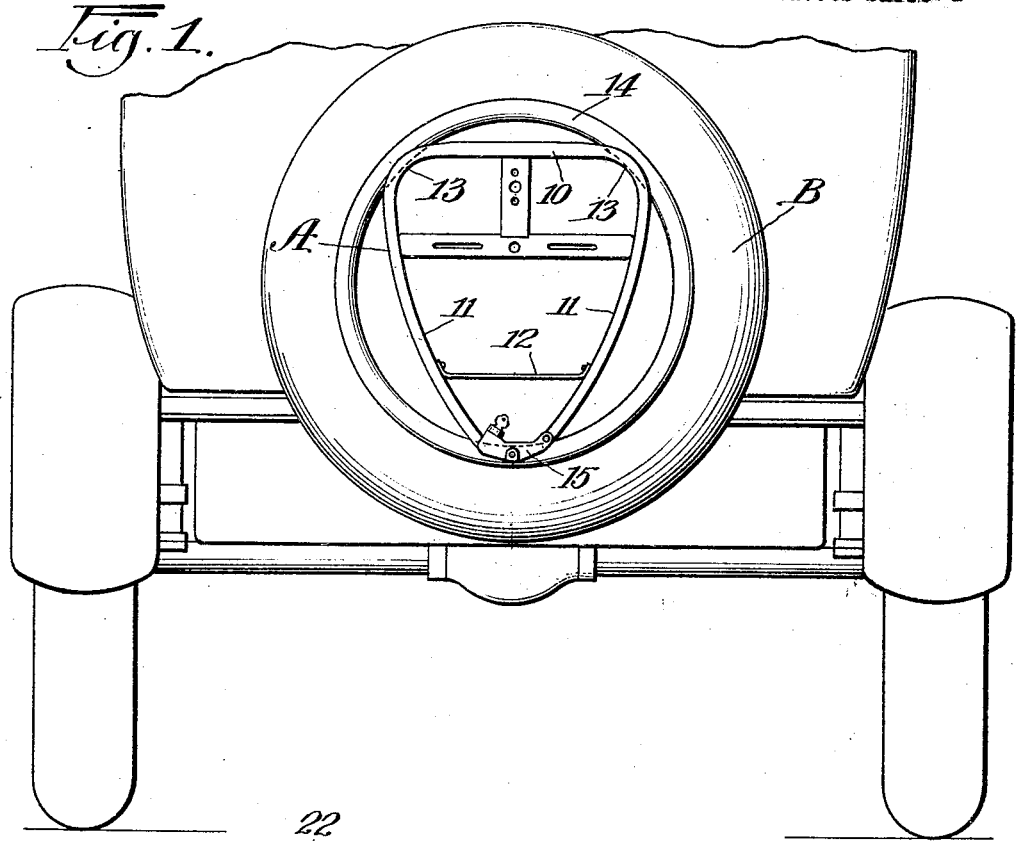
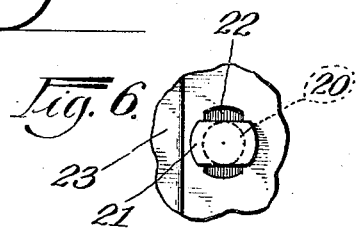
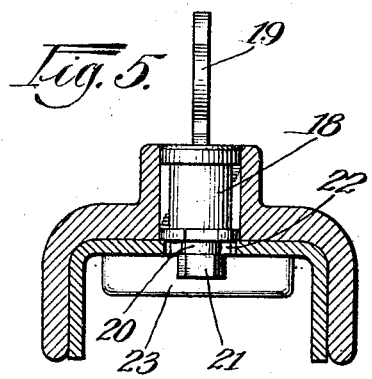
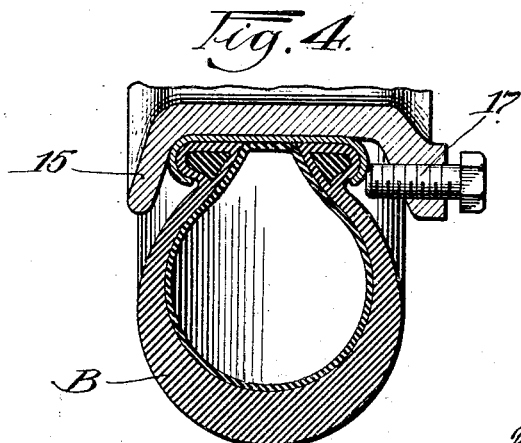
Inventors:
Orville S. Hershey,
Ernest J. Van Sickel,
William A. Henderson,
By their Attorneys.

Jan. 20, 1931. O. S. HERSHEY ET AL 1,789,437
SPARE TIRE LOCK
Filed Oct. 26, 1928   2 Sheets-Sheet 2

Inventors:
Orville S. Hershey,
Ernest J. Van Sickel,
William A. Henderson,
By their Attorneys.

Patented Jan. 20, 1931

1,789,437

UNITED STATES PATENT OFFICE

ORVILLE S. HERSHEY, ERNEST J. VAN SICKEL, AND WILLIAM A. HENDERSON, OF CHICAGO, ILLINOIS, ASSIGNORS, BY MESNE ASSIGNMENTS, TO OAKES PRODUCTS CORPORATION, OF NORTH CHICAGO, ILLINOIS, A CORPORATION OF MICHIGAN

SPARE-TIRE LOCK

Application filed October 26, 1928. Serial No. 315,124.

This invention relates to spare tire locks, and has to do particularly with locks which are adapted to be used on carriers for spare tires of automobiles.

The invention is fully described in the following specification and shown in the accompanying drawings, in which—

Figure 1 is a partial rear elevation of an automobile showing a spare tire carrier with lock thereon;

Fig. 4 is a partial section on line 4 of Fig. 2;

Fig. 5 is an enlarged section on line 5 of Fig. 2; and

Fig. 6 is a partial bottom view of the locking bolt of Fig. 5.

Figure 3:
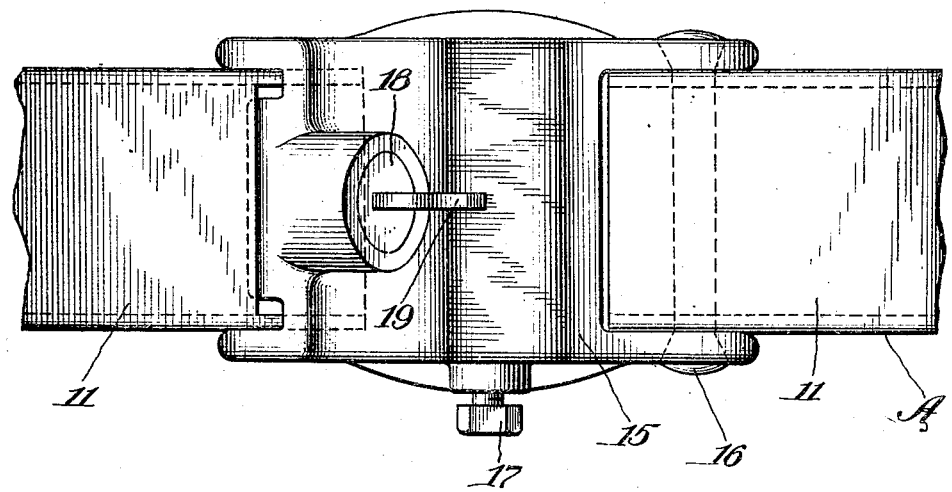
Fig. 3 is a top plan view of the portion shown in Fig. 2.

The embodiment illustrated comprises an automobile having a spare tire carrier A which, in the form shown, comprises a flanged strap or bar having an upper horizontal section 10 from which depends a pair of inwardly curving side sections 11 joined by preference by a cross brace 12. Two rounded upper corners 13 are provided for engaging the rim 14 of a tire B which is thereby suspended in place. The lower ends of the two side sections terminate just above the inner line of the tire rim so that when the rim is placed between the carrier flanges at the corners 13, the lower portion can swing into or out of alignment with the proximate ends of the carrier side sections.

Figure 2:
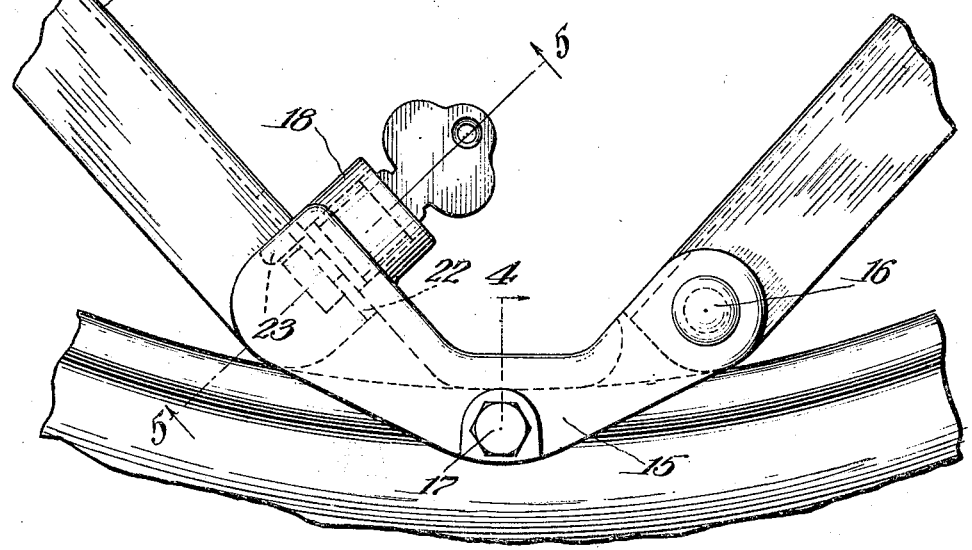
Fig. 2 is a partial enlarged view of the lower portion of the carrier containing lock.

A flanged latch 15 of U-shaped cross section is hingedly connected by means of a pin 16 with one of the two lower ends of the carrier, the opposite end of the latch being adapted to engage and lock with the other carrier end, as will later be described. When so locked, as shown in Fig. 2, the latch flanges will engage the rim 14 so as to confine its lower portion against movement. To accommodate rims of various widths, and to prevent undue movement on the carrier mounting, set-screws 17 may be provided upon the latch. If desired, similar set-screws may also be used at the upper corners 13.

The latch may be equipped with a cylinder lock 18 which is operated by means of a key 19. Extending axially from the cylinder is a bolt 20 which carries a head 21 which may be elongated, as shown. This head is adapted to pass through a hole 22 cooperating in the proximate carrier end, and when entered therethrough to be turned in response to actuation of the key 19 so as to engage with the under face thereof. When turned to such a locking position, the latch is secured in place so as to cooperate with the supporting corners 13 of the carrier to lock the rim against withdrawal. Only by use of the key to turn the bolt to an unlocking position can the latch be disengaged from the tire so as to permit demounting of the latter from the carrier. The swinging latch end is preferably provided with a depending lip 23 adjacent the locking bolt, and when the latch is in engaging position as shown in Fig. 2, this lip is disposed between the bolt and the proximate tire carrier end so as to present a barrier against any attempted tampering with the former.

While I have shown and described but a single embodiment of my invention, it is to be understood that it is capable of many modifications. Changes, therefore, in the construction and arrangement may be made which do not depart from the spirit and scope of the invention as covered by the appended claims.

I claim:

1. In combination, an automobile spare tire carrier adapted to lie within a tire rim and to engage the same at one part of its circumference, a latch movable into engagement with another portion of said rim to retain it on said carrier and means pivotally connecting the latch to the carrier to swing about an axis which is parallel to the axis of the tire rim.

2. In combination, an automobile spare tire carrier for a tire rim adapted to engage the same at one part of its circumference, a latch hinged to the carrier to swing about an axis parallel to the axis of the tire rim and movable into engagement with another portion of said rim to retain it on said carrier, and means for locking said latch in the retaining position.

3. In combination, an automobile spare tire carrier adapted to lie within a tire rim and to engage the same at one part of its circumference, a hinged latch movable through a path transverse to the tire rim axis into engagement with another portion of said rim to retain it on said carrier, and a rotatable locking bolt carried by said member and adapted to engage a fixed portion of the carrier to prevent the latch from being moved out of its engaging position.

4. In combination, an automobile tire rim, a carrier therefor having recessed portions adapted to engage spaced portions of the interior of the rim, a latch hinged to swing about an axis parallel to the axis of the tire rim and movable into and out of engagement with the interior of the rim at a point substantially diametrically opposite said spaced portions of the rim to secure said latch on the rim, and means for locking said latch in operative position.

5. In combination, an automobile tire rim, a carrier therefor having recessed portions adapted to engage spaced portions of the interior of the rim, a latch hinged to swing about an axis parallel to the axis of the tire rim and movable into and out of engagement with the interior of the rim at a point substantially diametrically opposite said spaced portions of the rim to secure said latch on the rim, and means for locking said latch to said carrier in operative position.

6. In combination, an automobile tire rim, a carried therefor having recessed portions adapted to engage spaced portions of the interior of the rim, a latch pivotally connected to one end of the carrier and movable through a path which is transverse to the axis of the tire rim into and out of engagement with the other end of the carrier and with the interior of the rim at a point substantially diametrically opposite said spaced portions of the rim to secure said latch on the rim, and means for locking said latch in operative position.

7. In combination, an automobile tire rim, a carrier therefor having recessed portions adapted to engage spaced portions of the interior of the rim, a latch of U-shaped cross section pivotally connected to one end of the carrier to swing about an axis which is parallel to the axis of the tire rim and movable into and out of engagement with the other end of the carrier and with the interior of the rim at a point substantially diametrically opposite to said spaced portions of the rim to secure said latch on the rim, and means for locking said latch in operative position.

8. In combination, an automobile spare tire carrier adapted to lie within a tire rim and to engage the same at one part of its circumference, and a latch of U-shaped cross section movable through a path transverse to the axis of the tire rim into engagement with another portion of said rim to retain it on said carrier.

9. In combination, an automobile spare tire carrier adapted to lie within a tire rim and to engage the same at one part of its circumference, a latch of U-shaped cross section hinged to the carrier for swinging movement about an axis parallel to the axis of the tire rim and movable into engagement with another portion of said rim to retain it on said carrier, and means for locking said member in the retaining position.

10. In combination, an automobile spare tire carrier adapted to lie within a tire rim and to engage the same at two points in its circumference, a latch of U-shaped cross section hinged to one end of said carrier for swinging movement about an axis parallel to the axis of the tire rim and movable into engagement with a third portion of said rim to retain it thereon, and a shouldered rotatable locking bolt carried by said latch and engageable with the other end of said carrier.

11. In combination with an automobile tire surrounding a rim, a carrier therefor providing a mounting from which the rim may depend with its lower portion free of engagement therewith, means extending between two separated portions of the carrier and movably connected with one adapted in one position to engage with the tire rim at a point remote from its engagement with the carrier in a manner to secure the rim in place upon the carrier, and a lock co-operating with said means to releasibly hold it in said securing position.

12. In combination, a spare tire carrier adapted to lie within a tire rim, the carrier including a pair of converging arms spaced apart at their proximate ends, and a latch engageable with the tire rim between the arm ends and pivotally joined to one so as to swing toward the other and when connected therewith being engaged also with the tire rim to lock the same in place.

In testimony whereof, we have hereunto set our hands this 23d day of October, 1928.

ORVILLE S. HERSHEY.
ERNEST J. VAN SICKEL.
WM. A. HENDERSON.